Patented Sept. 5, 1933

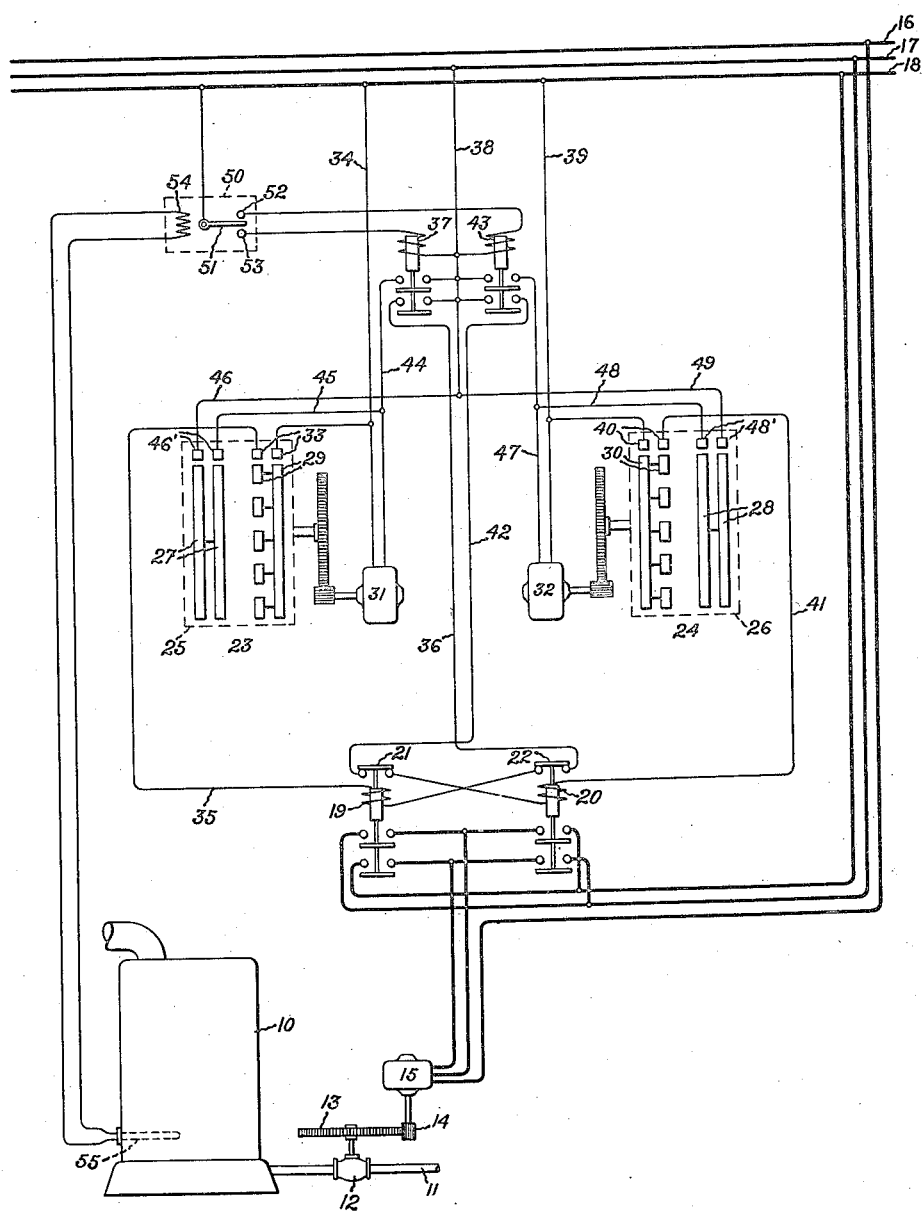

1,925,880

UNITED STATES PATENT OFFICE 1,925,880

CONTROL DEVICE

Victor Paschkis, Berlin, Germany, assignor to General Electric Company, a corporation of New York Application July 23, 1931, Serial No. 552,781, and in Germany August 7, 1930

20 Claims. (Cl. 236—69)

My invention relates to control devices for maintaining constant conditions, more particularly to heat regulating and balancing devices.

The invention particularly concerns a slow acting reversible regulating means making use of a stepping action to control the heat source whereby a constant temperature is maintained in response to a thermostat without the objectionable "overshooting" and "undershooting" present in the usual heating system.

Although the specific embodiment shows a valve for controlling a fluid supply for furnishing heat, it is readily applicable to control jets, dampers and other devices which control a heat source. The invention is applicable to bring about a balanced condition between a heat flow from a source of supply to a chamber to be heated and the flow of heat from this chamber due to radiation and other heat losses.

In usual devices of this character there is an inherent lag between variation in the heating action of the heating means and the resulting change in the temperature of the medium heated thereby. There is also as a rule an inherent lag in the response of the heating means to any control of the heating action thereof.

For the purpose of regulating the temperature of fluid fuel heated furnaces, valves are as a rule employed which regulate to a greater or less extent either the fuel such as gas, oil or coal dust, or combustion according to the temperature in the furnace to be regulated. The valves are operated by means of electric motors which are in turn controlled by a member dependent upon temperature by a contact thermometer. Because of the heat inertia of many furnaces it frequently happens that the valve will be completely opened or completely shut before the thermostatic element responds to the change of heating conditions to call for an opposite action of the valve. This causes a well-known and undesirable over-regulation known as overshooting or undershooting the desired temperature.

Efforts have been made to combat this over-regulation by using reduction gearing having a very high reduction factor, resulting in inefficient operation of the fluid control valve or by providing a complicated mechanism for controlling the speed of the valve motor in accordance with the difference between the temperature which it is desired to maintain and the temperature which actually exists. Neither of the above methods, however, are satisfactory since both are expensive and not entirely reliable.

The present invention obviates the above difficulties so as to provide a substantially constant predetermined temperature.

The preferred embodiment of my invention employs a reversible electric motor geared to a heat supply control valve through reduction gearing resulting in slow operation of the valve to open or to close. This motor is provided with a pair of reversing relays for controlling the direction of rotation of the motor, one to control rotation in one direction and the other to control the rotation in the other direction. Each of these relays in turn controlled by a timing device which causes energization of the relays for periods of short duration at predetermined intervals so long as the heat responsive device calls for a change in the heat supplying means. Thus a very slow operation of the fuel supply valve in small intermittent steps takes place.

These timing devices are in turn controlled by a thermostatic device responsive to the temperature within the chamber to be supplied with heat. Cooperating with this thermostatic device are a pair of relays which control the energization of the reversing relays means by the timing motor. These second relays initiate operation of the timing devices as well as control the intermittent energization of the reversing relays.

The timing means must be returned to initial position after each operation and in the preferred embodiment of my invention when once set into motion a complete cycle will be gone through before the timing means are again brought to rest. Thus, irrespective of the operation of the thermostatic device the timing means will go through a complete cycle before again coming to rest. The second relays which respond to the thermostatic means are therefore necessary to interrupt the operation of the reversing relays by the intermittent mechanism of the timing device in order that the valve motor will operate only so long as the thermostat calls for a change.

Thus, in response to temperature conditions the fuel supplying control means is operated gradually in small steps over a long period of time so that the fuel supply is either increased or decreased at such a rate that it will closely follow the temperature changes in the chamber to be heated. My slow acting control apparatus in this manner reduces the action of the control valve such that proper control of a constant predetermined temperature is made possible.

The drawing shows a schematic arrangement of my control apparatus and its associated circuits.

Fuel is admitted to the furnace 10 through the supply line 11 which is controlled by means of the valve 12. The valve 12 is operated by means of the reversible electric motor 15 geared by means of reduction gearing 13 and 14 to the valve 12 whereby upon operation of the motor 15 in either direction the valve 12 is very slowly opened or closed to increase or decrease the fuel supply to the furnace 10.

This motor 15 is connected to the supply lines 16, 17 and 18 by means of a reversing apparatus having a pair of relays 19 and 20. The lower contacts carried by the solenoid of each of the relays reverse the connections to the motor 15 to reverse the direction of rotation of the motor. The solenoids carry bridging members 21 and 22 for closing the upper pair of contacts to complete a circuit through the coil of relay 20 or the coil of relay 19 for energizing either one or the other of the relays under proper conditions.

Timing devices designated generally at 23 and 24 have drums 25 and 26 which carry the series of contacts thereon for controlling the operation of the solenoids. The drums shown in the drawing have been developed to show the position of the contacts on the surface thereof. The contacts 29 cooperating with the brushes 33 cause energization of the winding 19 of the relay to energize this relay for short periods of time at predetermined intervals as will be more fully disclosed below. The contacts 30 carried by the drum 26 serve the same function in causing intermittent operation of the relay 20.

The drums also carry the contacts 27 and 28 which cooperate with the brush members 46' and 48' to maintain the driving motors 31 and 32 of the respective drums energized after the rotation of these drums has been initiated by a thermostatic device to be described later. Reduction gearing is provided between the driving motors and the drums to cause a very slow rotation thereof during operation.

Thus, the timing devices cause both intermittent operation of the reversing relays and also maintain the timing motors energized until the drums are again in their initial position at which time the circuit through the motors is broken. In order to again set the timing motor into operation the thermostatic device to be described later must call for such operation in response to temperature conditions.

The circuits through the windings 19 and 20 of the relays are completed by means of relays 37 and 43. The lower contacts carried by the solenoid of these relays completes the circuit through the solenoids by means of the conductors 36 and 42 which terminate in the contacts cooperating with the upper bridging members 22 and 21 carried by the relays 19 and 20. The upper contacts of the relays 37 and 43 complete a circuit through the timing motors 31 and 32 to initiate operation of the timing mechanism in response to operation of the thermostatic device 50.

The thermostatic device 50 comprises an element 51 which closes upon contact 52 or 53 to energize relay 43 or 37 depending upon whether or not more heat or less heat is required in the furnace 10. A heat responsive element 55 cooperating with element 54 directly affecting the element 51 controls the thermostatic device to respond to temperature conditions within the furnace 10.

The operation of the device is as follows: Assuming the apparatus to be in the position indicated in the drawing, let it be supposed that more heat is required in the furnace 10. The heat responsive element 55 affects its cooperating member 54 to make the element 51 responsive to close the contact 52. A circuit is then completed from the supply line 18, element 51, contact 52, winding of relay 43, conductor 38 to the line 17. This energizes the relay 43 and operates the solenoid to close both pair of contacts by means of the bridging members carried thereon. A circuit is completed from the line 17, conductor 38, upper pair of contacts of relay 43, conductor 47, timing motor 32, conductor 39 to the line 18. This will immediately cause the motor 32 to rotate. In doing so the brushes 48' are made to contact with the contacts 28 as the drum 26 is rotated. It will be noted that contacts 28 are electrically connected. This completes a circuit from the line 17, the conductor 38, conductor 49, brushes 48' and contacts 28, conductor 48, conductor 47, motor 32, conductor 39 back to the other side of the line 18. It will be observed that this last circuit is maintained closed until the drum has made a complete revolution, at which time this circuit is again interrupted since contacts 28 are not continuous around the drum. This of course means that having been once set into operation the timing mechanism will complete an entire cycle of operations before again coming to rest, the thermostat having no control over the drum motor 32.

The brushes 40 will engage contacts 30 as the drum rotates and complete a circuit from the line 18, conductor 39, brushes 40 and contacts 30, conductor 41, winding of relay 20, bridging member 21 and upper contacts of relay 19, conductor 42 through the lower contacts of relay 43, and conductor 38 to the line 17. Thus, so long as brushes 40 and contacts 30 remain in engagement, the relay 20 will be energized to complete a circuit through the motor 15 which motor 15 will rotate to slowly open the valve 12 to admit more fuel to the furnace 10. This energization will be intermittent since it will be observed that the right-hand row of contacts 30 are separated from each other and electrically connected to the left-hand contact 30.

The intermittent energization of the relay 20 will continue so long as the relay 43 is energized to maintain its bridging members in the closed position. When the thermostatic device 50 opens the contact 52 in response to temperature changes within the furnace 10, the relay 43 becomes de-energized thus permitting the bridging members to return to open position. The circuit through the winding of relay 20 to the supply line 17 is thus opened and although the timing drum continues to rotate it will have no effect upon the relay 20, the relay 20 remaining with its contacts in the open position. The fuel supply valve will then remain stationary since the motor 15 is not energized.

If the thermostatic element in response to a rise in temperature moves to the opposite position to close contact 53, the reverse action takes place when the relay 37 is energized to pick up the reversing relay 21 and to energize the motor 31 of the timing drum 23 to cause the motor 15 to close the valve. The valve of course becomes stationary when the element 51 opens the contact 53 to deenergize the relay 37.

Due to the very slow operation of the valve 12 which results from the introduction of the timing mechanism, the overshooting and the undershooting of the temperature controlling apparatus is reduced to an absolute minimum since the fuel supply closely follows the temperature conditions within the chamber to be heated. So long as the element 51 is either on contact 52 or 53 the timing devices 24 or 23 will cause intermittent energization of the relays 20 and 19 and hence operation of the valve to open or close. At all other times the control apparatus is deenergized and the valve remains stationary.

It will be noted that the contacts 30 are interrupted at frequent intervals around the periphery of the drum. The right-hand row of these contacts can be made of equal length or the length can be varied as desired; so the distance between these contacts may also be varied. In this manner the periods during which the circuit through the winding of the relay 20 is closed may be varied, as also the interval between the periods of energization. For example, the coil 20 can be energized for shorter and shorter periods as the fuel supply rate is increased, thereby decreasing the increments of added fuel as the desired temperature is reached.

The embodiment of the invention illustrated and described herein has been selected for the purpose of clearly setting forth the principles involved. It will be apparent, however, that the invention is susceptible of being modified to meet the different conditions encountered in its use and I therefore intend to cover by the appended claims all modifications within the true spirit and scope of my invention.

What I claim as new and desire to secure by Letters Patent of the United States is:

1. An automatic self-balancing heat control device for maintaining a constant temperature having an electro-responsive heat regulating means, a timing means for controlling energization of said heat regulating means to vary the supply of heat gradually in small steps, said timing means including a circuit controlling means movable through a cycle to energize said heat regulating means for short periods of time at predetermined intervals, and a thermostatic device for controlling said timing means to initiate operation of said timing means and to render said timing means ineffective at any time during movement of said circuit controlling means through its cycle to maintain said heat regulating means stationary to maintain a constant predetermined temperature.

2. An automatic self-balancing heat control device for maintaining a constant temperature having a slow acting electrical reversible heat regulating device for increasing or decreasing the supply of heat, a timing device movable through a cycle for energizing said heat regulating device at predetermined intervals for short periods of time during said cycle to very gradually increase the supply of heat or very gradually decrease the supply of heat and a thermostat controlling said timing device to render the same ineffective during any part of the cycle to maintain a constant predetermined temperature.

3. An automatic self-balancing heat control device for maintaining a constant temperature having a heat supplying means, a reversible electric motor geared thereto to produce slow action thereof, timing means electrically connected to said motor having a plurality of contacts successively effective for energizing said motor in either direction for short periods of time at predetermined intervals to very gradually increase or decrease the heat supply and a thermostat for controlling said timing means to initiate operation thereof and to render the same ineffective to energize said motor to maintain a constant temperature irrespective of the position of said contacts.

4. An automatic self-balancing heat control device for maintaining a constant temperature having a heat regulating device, a reversible electric motor connected thereto for producing slow action thereof, electroresponsive means for controlling operation of said motor, a timing device having a movable means provided with a plurality of contacts successively effective to energize said electroresponsive means for short periods of time at predetermined intervals to increase or decrease the heat supply gradually whereby the heat supply very closely follows the demand to maintain a constant temperature, other electroresponsive means cooperating with said timing device to control energization of said first electroresponsive means by said timing device and a thermostatic device controlling said other electroresponsive means to cause the intermittent operation of said motor in either direction or for rendering said timing device ineffective to energize said first electroresponsive means at any time whereby a constant predetermined temperature is maintained.

5. An automatic self-balancing heat control apparatus for maintaining a constant temperature having a heat regulating device, a reversible motor connected thereto to produce slow action thereof, an electroresponsive means for energizing said motor to increase the heat supply, another electroresponsive means for energizing said motor in a reverse direction to decrease the heat supply, a timing device for each of said electroresponsive means movable through a cycle and adapted to energize said electroresponsive means for short periods of time at predetermined intervals during said cycle to gradually increase or decrease the heat supply, other electroresponsive means for controlling energization of said motor energizing electroresponsive means by said timing devices and adapted to initiate operation of said timing devices, and a thermostat responsive to temperature conditions for controlling said last electroresponsive means to maintain a constant predetermined temperature, and means for stopping operation of said timing device at the end of said cycle when said last electroresponsive means is in position to maintain a constant temperature.

6. An automatic self-balancing heat control apparatus for maintaining a constant temperature having an electrical heat control device, a timing means for said heat control device having a drum carrying a plurality of contacts successively effective to energize said heat control means for short periods of time at predetermined intervals to cause a gradual change in the heat supply means for initiating operations of said timing means and a thermostatic device for controlling the intermittent energization of the heat control device by said timing means to maintain a predetermined constant temperature, and means independent of said thermostatic device for causing each of said contacts to pass through the effective position and for returning said drum to initial position.

7. An automatic self-balancing heat control apparatus for maintaining a constant temperature having an electrical heat control device, a timing means for said heat control device having a drum carrying a plurality of contacts adapted to successively energize said heat control device for short periods of time at predetermined intervals to cause a gradual change in the heat supply, said drum also having means for returning said drum to initial position, and a thermostatic means for controlling energization of said heat control device by said timing means irrespective of the position of said contacts to maintain a constant predetermined temperature.

8. An automatic self-balancing heat control apparatus for maintaining a constant temperature, having a heat regulating device, a timing means including drums having a plurality of means successively effective for causing operation of said heat regulating device for short periods of time at predetermined intervals for gradually increasing or decreasing the heat supply in response to temperature conditions to maintain a substantially predetermined constant temperature and a thermostatically controlled device for initiating operation of said timing means and for rendering said timing means ineffective to cause operation of said heat regulating means when a substantially predetermined constant temperature is obtained, said drums having other means for returning said drums to initial position after a substantially constant temperature is obtained.

9. An automatic self-balancing heat control apparatus for maintaining a constant temperature, having a heat regulating device and a timing device operable through a cycle to cause operation of said heat regulating device for short periods of time at predetermined intervals to increase or decrease the heat supply in small steps in response to temperature conditions, a thermostatically controlled device for initiating operation of said timing means to move through its cycle but effective to prevent intermittent operation of said heat regulating device by said timing device at any time during said cycle whenever a substantially constant temperature is being maintained.

10. An automatic self-balancing heat control apparatus for maintaining a constant temperature, having a heat regulating device, a reversible motor for operating said device to increase or decrease the heat supply, an electroresponsive means for energizing said motor to increase the heat supply, another electroresponsive means for energizing the motor in a reverse direction to decrease the heat supply, a timing device for each of said electroresponsive means having a contact carrying drum for energizing said electroresponsive means for short periods of time at predetermined intervals for gradually increasing or decreasing the heat supply in response to temperature conditions to maintain a substantially constant temperature.

11. An automatic self-balancing heat control apparatus for maintaining a constant temperature, having a heat regulating device, a reversible motor for operating said device to increase or decrease the heat supply, an electroresponsive means for energizing said motor to increase the heat supply, another electroresponsive means for energizing the motor in a reverse direction to decrease the heat supply, a timing device for each of said electroresponsive means having a contact carrying drum for energizing said electroresponsive means for short periods of time at predetermined intervals for gradually increasing or decreasing the heat supply in response to temperature conditions to maintain a substantially constant predetermined temperature, and a thermostatically controlled device for initiating operation of said timing means and for rendering said timing means ineffective to cause operation of said heat regulating means when a substantially predetermined constant temperature is obtained.

12. An automatic self-balancing heat control apparatus for maintaining a constant temperature, having a heat regulating device, a reversible motor for operating said device to increase or decrease the heat supply, an electroresponsive means for energizing said motor to increase the heat supply, another electroresponsive means for energizing the motor in a reverse direction to decrease the heat supply, a timing device for each of said electroresponsive means having a contact carrying drum for energizing said electroresponsive means for short periods of time at predetermined intervals for gradually increasing or decreasing the heat supply in response to temperature conditions to maintain a substantially constant temperature, and a thermostatically controlled device for initiating operation of said timing means and for rendering said timing means ineffective to cause operation of said heat regulating means when a substantially predetermined constant temperature is obtained, and means for returning said drums to initial operating position independently of the action of said thermostatically controlled device.

13. An automatic self-balancing heat control apparatus for maintaining a constant temperature having a heat-regulating device, a reversible motor connected thereto to produce slow action thereof, reversing switches connected to control said reversible motor, a device responsive to temperature conditions and movable to one position when the temperature exceeds a predetermined limit to operate one of said reversing switches to cause movement of said motor in one direction and movable to another position when the temperature exceeds another predetermined lower limit for operating another of said reversing switches to cause movement of said motor in the opposite direction, and a timing means cooperating with said temperature-responsive device and said reversing switches for periodically opening said reversing switches to deenergize said reversible motor, said temperature responsive device moving to an intermediate position to maintain said motor unenergized when a predetermined constant temperature is obtained.

14. An automatic self-balancing heat control device for maintaining a constant temperature having a heat-regulating device, an electric motor connected thereto for producing slow action thereof, electro-responsive means for controlling operation of said motor including a timing device having a drum provided with a plurality of contacts successively effective to energize said motor, said contacts being of successively shorter lengths whereby said motor is energized for varying periods of time at predetermined intervals to vary the heat supply gradually whereby the heat supply very closely follows the demand to maintain a constant temperature, and a thermostatic device cooperating with said electro-responsive means for controlling said timing means and for rendering said timing means ineffective to energize said motor when a predetermined constant temperature is maitained.

15. An automatic self-balancing heat control apparatus for maintaining a constant temperature having a heat-regulating device, a reversible motor connected thereto to produce slow action thereof, reversing switches connected to control said reversible motor, a timing means for said reversing switches for periodically opening either of said reversing switches when either of said reversing switches is in the closed position to deenergize said reversible motor, and a device responsive to temperature conditions and cooperating with said timing means and said reversing switches and movable to one position when the temperature exceeds a predetermined limit to operate one of said reversing switches to cause movement of said motor in one direction and movable to another position when the temperature exceeds another predetermined lower limit for operating another of said reversing switches to cause movement of said motor in the opposite direction, said temperature responsive device moving to an intermediate position to maintain said motor unenergized when a predetermined constant temperature is obtained.

16. An automatic self-balancing heat control apparatus for maintaining a constant temperature having an electrically driven reversible heat-regulating device, reversing switches connected to control said regulating device, a timing means for periodically opening said reversing switches when said reversing switches are in the closed position, a device responsive to temperature conditions for setting said timing means into operation and movable to one position when the temperature exceeds a predetermined limit to operate one of said reversing switches to cause movement of said motor in one direction and movable to another position when the temperature exceeds another predetermined lower limit for operating another of said reversing switches to cause movement of said motor in the opposite direction, said temperature responsive device moving to an intermediate position to maintain said motor unenergized when a predetermined constant temperature is obtained.

17. An automatic self-balancing heat control apparatus for maintaining a constant temperature having a reversible electrically driven heat-regulating device, reversing switches connected to control said regulating device to cause movement thereof in opposite directions, a device responsive to temperature conditions for selectively operating said switches, a timing means cooperating with said temperature responsive device and said reversing switches, said timing means being set into operation by said temperature responsive device and having means for periodically opening said reversing switches to stop movement of said heat-regulating device, said temperature responsive device maintaining said regulating device in one position when a predetermined constant temperature is obtained.

18. An automatic heat control apparatus for maintaining a constant temperature having a heat-regulating device, electroresponsive means for energizing said device, a timing device having means adapted to intermittently energize said electroresponsive means, and means responsive to temperature conditions and movable to one position for initiating operation of said timing means and movable to another position for stopping operation of said timing means.

19. An automatic heat control apparatus for maintaining a constant temperature having an electric motor driven heat-regulating device, an electromagnetic switch adapted to energize said motor driven heat-regulating device, a circuit controlling member adapted to intermittently energize said electromagnetic switch, a timing means therefor, a second circuit controlling member in series with said first circuit controlling member for controlling the energization of said electromagnetic switch and for controlling said timing means, and means responsive to temperature conditions for operating said second circuit controlling member.

20. An automatic heat-regulating apparatus for maintaining a constant temperature having an electric motor driven heat-regulating device, an electromagnetic switch adapted to energize said motor driven heat-regulating device, a circuit controlling member adapted to intermittently energize said electromagnetic switch, a timing means therefor, a second circuit controlling member for initiating the operation of said timing means and in series with said first circuit controlling member for controlling energization of said electromagnetic switch, and means responsive to temperature conditions for operating said second circuit controlling member.

VICTOR PASCHKIS.